United States Patent
Wang et al.

(10) Patent No.: US 7,626,788 B2
(45) Date of Patent: Dec. 1, 2009

(54) CONTROL CIRCUIT OF GROUND FAULT CIRCUIT INTERRUPTER (GFCI)

(75) Inventors: Kunliu Wang, Wujiang (CN); Fudong Shu, Wujiang (CN); Kuiyang Zhang, Wujiang (CN)

(73) Assignee: Suzhou Songbao Electric Co., Ltd., Jiangsu Province (CN)

( * ) Notice: Subject to any disclaimer, the term of this patent is extended or adjusted under 35 U.S.C. 154(b) by 50 days.

(21) Appl. No.: 11/782,145

(22) Filed: Jul. 24, 2007

(65) Prior Publication Data

US 2008/0022153 A1     Jan. 24, 2008

(30) Foreign Application Priority Data

Jul. 24, 2006    (CN)          2006 2 0075979

(51) Int. Cl.
     *H02H 3/00*      (2006.01)
(52) U.S. Cl. .............................. 361/42; 361/49; 361/50
(58) Field of Classification Search .................... 361/42, 361/44–50
See application file for complete search history.

(56) References Cited

U.S. PATENT DOCUMENTS

| | | | |
|---|---|---|---|
| 5,173,673 A * | 12/1992 | Weigand et al. ............... 335/18 |
| 6,021,034 A * | 2/2000 | Chan et al. ..................... 361/42 |
| 6,952,150 B2 | 10/2005 | Radosavljevic et al. |
| 7,253,629 B1 * | 8/2007 | Richards et al. ............. 324/424 |
| 2004/0070899 A1 * | 4/2004 | Gershen et al. ............... 361/42 |
| 2007/0030607 A1 * | 2/2007 | Liscinsky, III ............... 361/42 |
| 2008/0002314 A1 * | 1/2008 | Batko et al. ................... 361/42 |
| 2008/0112099 A1 * | 5/2008 | Li et al. ......................... 361/42 |

* cited by examiner

*Primary Examiner*—Rexford N Barnie
*Assistant Examiner*—Nicholas Ieva
(74) *Attorney, Agent, or Firm*—Howard & Howard Attorneys PLLC (57) ABSTRACT

A control circuit of Ground Fault Circuit Interrupter (GFCI), includes a load connection circuit used to connect power end and load end while transferring AC thereof, a creepage detection circuit, a trip control circuit and a trip circuit, and further includes a self-diagnosis current generation circuit, a self-diagnosis display circuit and a first switch duct. When the input AC in positive half-cycle, one of the said trip circuit and the self-diagnosis display circuit is electrically connected, while another should be electrically connected while the input AC in negative half-cycle, so without manpower-provided simulated signal, the control circuit of GFCI can be self diagnosed of creepage protection function, for the feedback of the stand or fall circs in time.

6 Claims, 6 Drawing Sheets

CONTROL CIRCUIT OF GROUND FAULT CIRCUIT INTERRUPTER (GFCI)

CROSS-REFERENCE TO RELATED APPLICATIONS

The subject patent application claims priority to and all the benefits of Chinese Patent Application No. 200620075979.X, which was filed on Jul. 24, 2006, with the State Intellectual Property Office of the People's Republic of China.

TECHNICAL FIELD

This invention mainly relates to a kind of control circuit of creepage protection device, specifically to a control circuit of Ground Fault Circuit Interrupter.

BACKGROUND

Creepage protection device can prevent personal electric shock and fire accident effectively. Especially GFCI, with function of creepage protection and neutral grounding protection, has been used widely.

Creepage protection device may also have fault emerged in itself, such as life termination of the inside component, causing the creepage protection function to be lost, and in this instance, if we use this device unceasingly, a life threatening electric shock or fire accident may be present.

Thus, some GFCI manufacturers start to design control circuit of the GFCI which has self-diagnosis function, accordingly to diagnose the creepage protection device of the control circuit if in good condition even having function of creepage protection, such as described in U.S. Pat. No. 6,952,150 a self-diagnosis circuit for indicating the end of life of an interrupter. However, for the self-diagnosis circuit is coupled in a test circuit, requiring manpower-provided simulated signal, but having no capability of self-diagnosis, the self-diagnosis circuit can not duly reflect the stand or fall instance of the circuit interrupter in the operation, without deep-dyed self-diagnosis function.

Besides, due to the self-diagnosis circuit may have fault emerged in itself, such as life termination of the inside component, causing self-diagnosis function to be lost, in this instance, the self-diagnosis circuit may still displays in situation of creepage protection although creepage protection function has already been lost. If we use this device unceasingly, a life threatening electric shock or fire accident may be present.

SUMMARY OF THE INVENTION

The present invention is to provide a kind of control circuit of GFCI, which can be self-diagnosed whether with creepage protection function without manpower-provided simulated signal, to duly feedback the stand or fall instance of the GFCI in operation.

In order to approach the above aim, the present invention provides a kind of control circuit of GFCI with creepage protection function, having load connection circuit, to electrically connect power end Line and load end Load, and transfer AC thereof; creepage detection circuit, comprising detection winding N1 being used on transforming the flux change capacity into influence potential output, the lead of said load connection circuit going across the detection winding N1; trip circuit, including trip winding J, being used for changing current into electromagnetism power; and trip control circuit, connected between creepage detection circuit and trip winding J, for comparing the input electrical signal with a predetermined value, as when the input electrical signal lager than the predetermined value, the output end of said trip control circuit exporting effective electrical signal. The described control circuit of GFCI further comprises self-diagnosis current generation circuit, which is coupled to the said load connection circuit on at least one end; and the lead of self-diagnosis current generation circuit going across the said detection winding N1; self-diagnosis display circuit, for displaying creepage protection function whether in good state; and a first switch duct, which has at least two connection ends and a control end to control the connection end to be electrically connected or disconnected, the control end of said first switch duct being coupled to the output end of the trip control circuit, while the said trip circuit and self-diagnosis display circuit respectively connected to a connection end of the said first switch duct; when the input AC on the positive half cycle, the trip circuit and one open for self-diagnosis display circuit. When input AC in positive half cycle, one of the trip circuit and self-diagnosis display circuit is electrically connected, while another of the said trip circuit and self-diagnosis display circuit is electrically connected if the input AC in negative half circle.

The said control circuit of GFCI also includes a self-diagnosis terminal circuit, for disconnecting self-diagnosis display circuit after completing display, the said terminal circuit having dynatron Q.

The self-diagnosis display circuit further comprises optoelectronic couple (OC), the output end of the said OC connected to a second switch duct SCR2 which having at least two connection ends being coupled to the output end of OC and a control end for controlling the said connection end to be electrically connected or be disconnected.

The said control circuit of said GFCI also includes an indication circuit for the end of life, being connected between the two connection ends of the second switch duct SCR2.

The said dynatron Q has a base, being coupled to one connection end of the second switch duct SCR2, another connection end of which is grounded.

The said dynatron Q also has collector and emitter. The said self-diagnosis current generation circuit includes LED D6 and resistance R9, series of the LED D6 and resistance R9 being electrically connected to the load connection circuit at one end, and connected to the collector or emitter of said dynatron at the other end.

The said self-diagnosis display circuit includes resistance R6, capacitance C8, LED D7 and optoelectronic couple (OC), series of the said Resistance R6, Capacitance C8, LED D7 being electrically connected between the two connection ends of said first switch duct, while the said OC being paralleled with the two ends of LED D7.

LED D6 is electrically connected in the said trip circuit.

The said indication circuit for end of life includes resistance R10 and LED1, series of the said LED1 and Resistance R10 being electrically connected between the two connection ends of second switch duct SCR2. A capacitance C7 is paralleled with the two connection ends of said second switch duct SCR2.

Compared with existed traditional art, the present invention has advantages as following:

1. For the control circuit has self-diagnosis current generation circuit, and self-diagnosis current generation circuit can automatically distill certain current as fault current from the load connection circuit when the input AC in positive half-cycle or negative half-cycle, and bring to the detection winding N1, the control circuit should process self-diagnosis without manpower-provided simulated signal;

2. Due to the self-diagnosis terminal circuit, when the OC of said self-diagnosis display circuit shines, the current exported from OC will lead the second switch duct SCR2 closed, to make the said dynatron Q be transformed to open estate from close estate because of the base without offset voltage, resulting in the self-diagnosis display circuit stop working until next cycle of AC, and the self-diagnosis will start to work again automatically, in this way, during one cycle of AC, the control circuit of GFCI is in self-diagnosis only for one time, to avoid large power consumption caused by work repeat; and 3. Due to the indication circuit for the end of life, if the creepage protection lapses by parts aging, puncture or other reasons, or the self-diagnosis display circuit has problem emerged in itself, the OC of said self-diagnosis display circuit will not shine, so no current will exported of the output end of said OC, therefore the second switch duct SCR2 not be closed, and the indication circuit for the end of life being short by the second switch duct SCR2 originally will has voltage drop thereof, leading the LED1 shine, namely indicating, the control circuit of the GFCI is in aging failure and need be replaced, to keep user safe in utilizing electric.

DETAILED DESCRIPTION OF PREFERRED EMBODIMENTS

Figure 6:
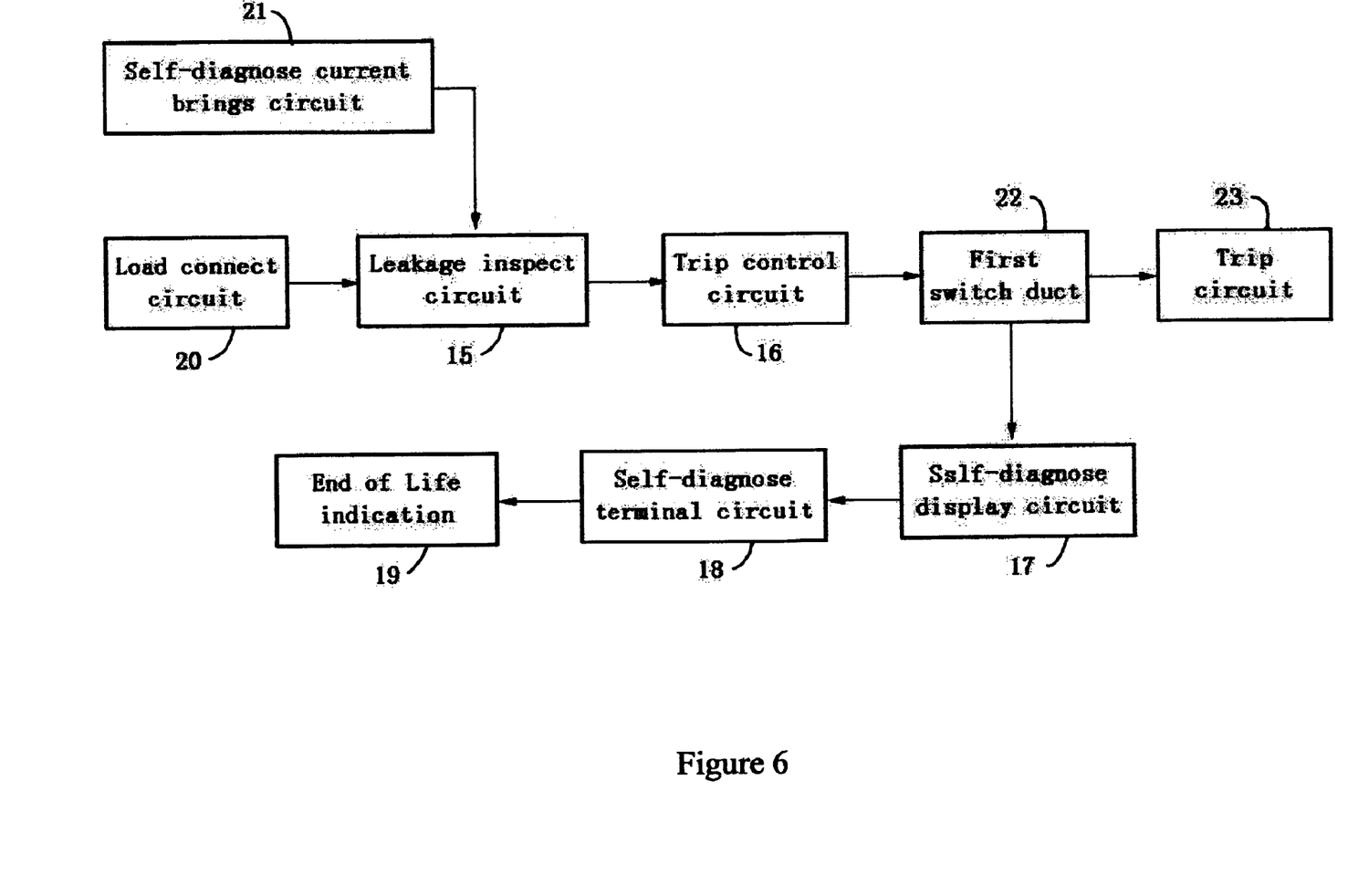
FIG. 6 is diamond sketch map of this invention.

Referred to the diamond sketch map as shown in FIG. 6, the control circuit of GFCI according to this invention comprises load connection circuit 20, used to electrically connect power end Line and load end Load besides transporting AC thereof; creepage detection circuit 15, including detection winding N1, for transforming the flux change capacity into influence potential output, the lead of said load connection circuit 20 going across the said detection winding N1; trip control circuit 16, being electrically connected to creepage detection circuit 15, for comparing the input electrical signal with a predetermined value, as only when the input electrical signal lager than the said predetermined value, the trip control circuit 16 output end exporting effective electrical level; trip circuit 23, including trip winding J, which is connected to the trip control circuit 16 and changes the current into electromagnetism power; self-diagnosis current generation circuit 21, being coupled to the said load connection circuit on at least one end, and the lead of said self-diagnosis current generation circuit 21 going across the said detection winding N1; self-diagnosis display circuit 17, for displaying creepage protection function whether in good condition; and first switch duct 22, having at least two connection ends and control end for controlling the connection ends to be open or closed. The control end of said first switch duct 22 is coupled to the output end of said trip control circuit 16, and the trip circuit 23 and self-diagnosis display circuit 17 are respectively electrically connected to the connection ends of said first switch duct 22. When the input AC in positive half-cycle, one of the trip circuit 23 and self-diagnosis display circuit 17 is closed, and when the input AC in negative half-cycle, another of the trip circuit 23 and self-diagnosis display circuit 17 is open.

In the above-described embodiment, the first switch duct is made of controllable silicon SCR1.

The control circuit of GFCI further comprises self-diagnosis terminal circuit 18, for open the self-diagnosis display circuit 17 after the display process completed.

The control circuit of GFCI may also include indication circuit 19 for end of life, which shines if the self-diagnosis display circuit 17 in fault or failure of creepage protection function.

As shown in the attached drawings from FIG. 1 to FIG. 5, detection winding N1, capacitance C0, capacitance C1 and resistance R3 form a creepage detection circuit 15, two leads of the load connection circuit 20 going across the said detection winding N1, the output end of which is paralleled with capacitance C0, and connected to capacitance C1 in series on one end, the other end of C1 being connected in series to resistance R3.

Integrated amplifier chip IC, resistance R1 and capacitance C4 form trip control circuit 16. The said integrated amplifier chip IC is especially used for GFCI, and will be explained by RV 4145 hereinafter. The other end of R3 is electrically connected to one pin of the input end 1 of integrated amplifier chip IC, while the other end of said detection winding N1 is connected with another pin of the input end 3 of said integrated amplifier chip IC, forming a differential input circuit coupled to transformer. R1 is a feedback resistance, with one end connected to a pin of integrated amplifier chip IC, and the other end connected to a pin 7 of the output end of said integrated amplifier chip IC, wherein the size of R1 determines the amplification multiple of the integrated amplifier chip IC, namely determining the current value in trip motion fault of GFCI. The pin of trigger node 5 of the integrated amplifier chip IC is connected to the control cabinet of said controllable silicon SCR1, with anti-jamming capacitance C4 paralleled between the control cabinet of controllable silicon SCR1 and ground.

Trip circuit 23 includes trip winding J and LED d6. Anode of the controllable silicon SCR 1 is connected to one end of trip winding J, the other end of said trip winding through LED D6 connected to the electrical wire Line of GFCI, while cathode of the controllable silicon SCR1 is grounding.

When detecting the load connection circuit 20 on creepage protection, the detection winding N1 detects change of flux going thereof to transform the flux change into influence potential. Sum of current vector without fault current is zero, but the sum of current vector should not be zero with fault current, that leads to flux change, and the detection winding N1 will correspondingly induce relevant voltage signal, being amplified by integrated amplifier chip IC, and when the signal achieves initialization decided by resistance R1, the pin of trigger node 5 of the said integrated amplifier chip IC exports trigger signal, making the controllable silicon SCR1 closed, trip winding J electrified and change current into electromagnetism power, to magnetize the trip utensil to trip in the stated time and the GFCI open.

Self-diagnosis current-generation circuit (21) includes LED D8 and resistance R9. Resistance R6, Capacitance C8, LED D7 and optoelectronic couple (OC) forms self-diagnosis display circuit 17. Dynatron Q and resistance R8 forms self-diagnosis terminate circuit 18. The LED D8 in series with one end of the resistance R9 of self-diagnosis current-generation circuit 21, goes through the detection winding N1 at one end, being connected to the lead of load connect circuit 20 at the other end. The other end of R9 is electrically connected to collector electrode of the dynatron Q, the emitter junction of which is grounded, with the base electrode connected to one end of the resistance R8, the other end of R8 being connected to the collector electrode of the OC, the anode of controllable silicon SCR2 and one end of capacitance C7 and of resistance R10, the emitter of said OC being connected to the control cabinet of controllable silicon SCR2, the input of said OC being paralleled with one LED D7, one end of which is grounded, and the other end of which is connected to one end of capacitance C8, the other end of C8 being connected to one end of resistance R6, the other end of R6 being connected to the anode of the controllable silicon SCR1. The self-diagnosis current-generation circuit 21 can provide a man-made fault-detection signal for the control circuit of GFCI automatically, so the GFCI will start to execute self-diagnosis, if only the control circuit is electrified, without detection by hand of the circuit whether in normal state. To not influence this control circuit in normal work, that is to say to ensure GFCI normally trip, the normal trip signal caused by creepage current and man-made fault signal during self-diagnosis should be separated to the positive and negative half cycle of the power supply, by connecting one end of the trip winding with one LED D6 in series and connecting the lead going through the centre of said detection winding N1 to a LED D8 in series. This embodiment will be explained using the example in which the normal trip signal caused by fault current goes to the negative half cycle of power supply, while man-made fault signal of self-diagnosis goes to the positive half cycle of power supply.

Figure 1:
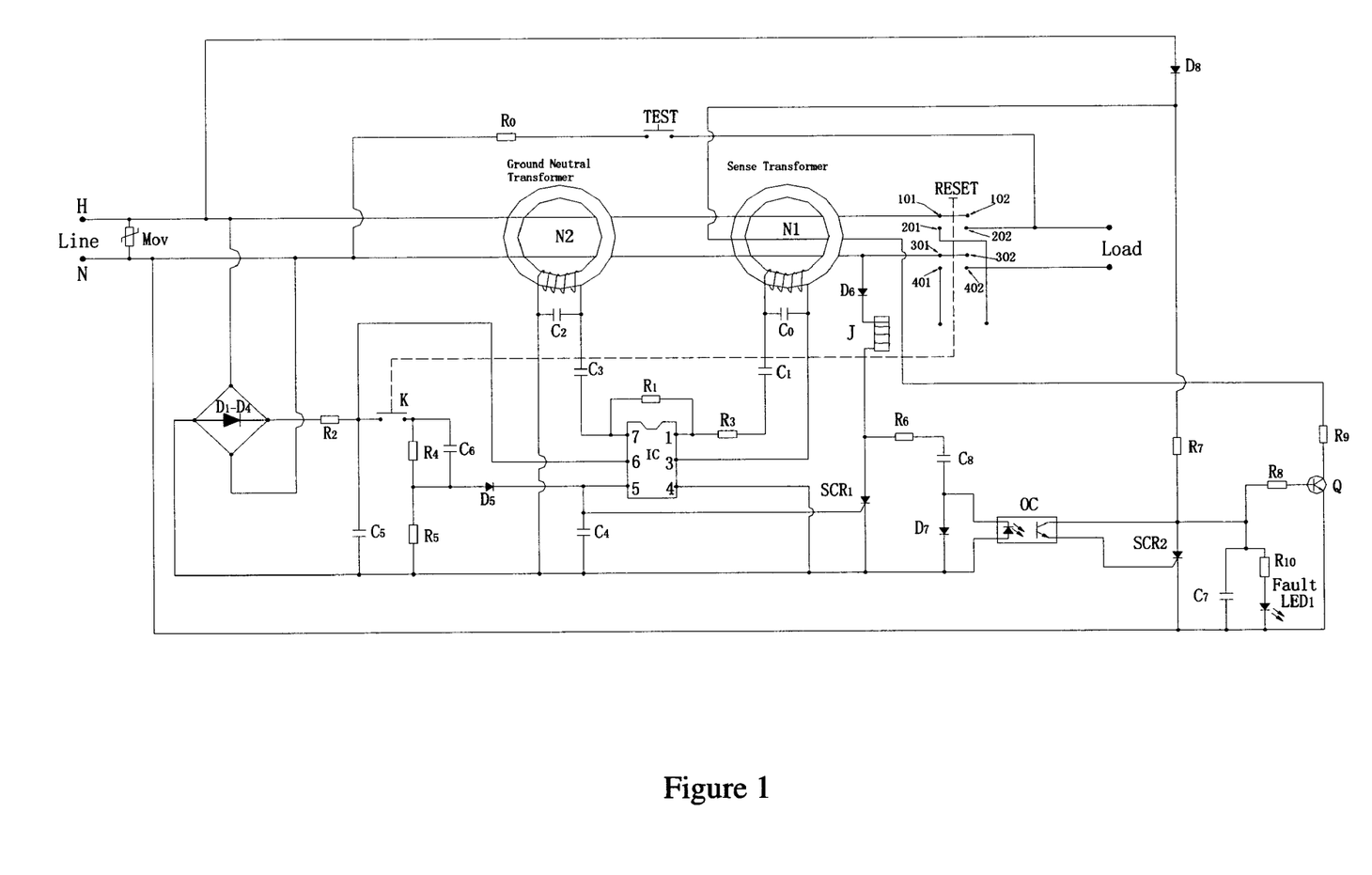
FIG. 1 is a circuit diagram of this invention.
Figure 2:
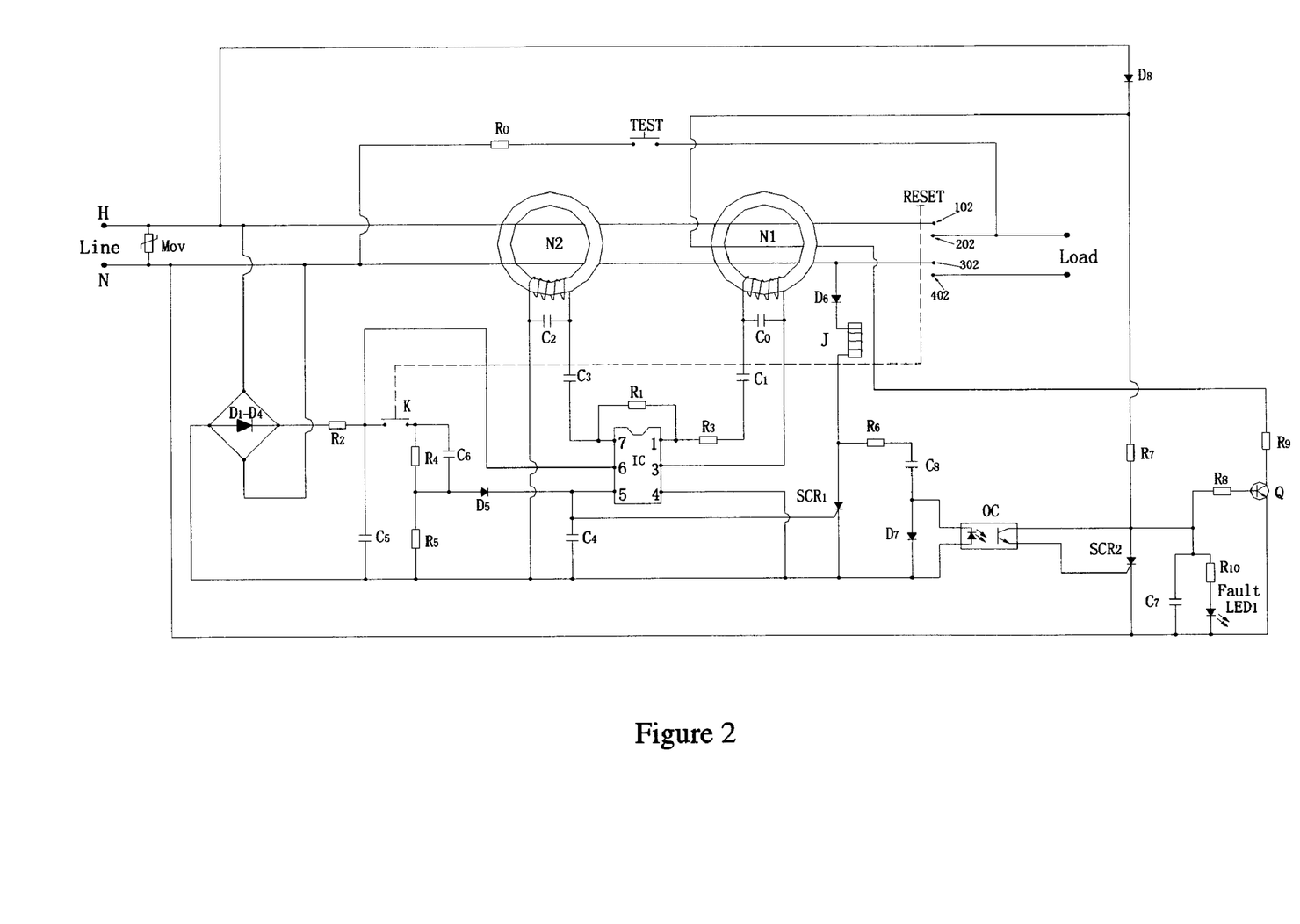
FIG. 2 is another circuit diagram of this invention.

As shown in drawing 1, in the positive half cycle of power supply, man-made fault current gets across the centre of detection winding N1 resistance R9 and dynatron Q to form a loop, wherein resistance R9 restricts the value of the fault current, in this way, the two end of detection winding N1 induces the relevant induction-voltage at once and inputs to trip control circuit 16. When the voltage reaches the initialization after amplified, the pin of the trigger node 5 of the trip control circuit 16 outputs a trigger signal to the controllable silicon SCR1 to make it closed. Once the controllable silicon SCR1 closed, the capacitance C8, the resistance R6, the controllable silicon SCR1 and the input end of the OC form a loop. For when the AC in negative half cycle, the capacitance C8 completes the charge process, its upper end accumulates certain positive charges, and nether end accumulates negative charges. When the AC in the positive half cycle, the capacitance C8 will discharge, lead the OC closed. Correspondingly, due to the function of LED D6, the trip circuit 23 will not be closed, and the trip winding J will not trigger the trip utensil. The output end of the OC is electrically connected to the second switch duct SCR 2, which is controllable silicon. When the OC closed, the emitter of its output end exports a trigger signal to the controllable silicon SCR2, to make the controllable silicon SCR2closed subsequently. Once the controllable silicon SCR 2 closed, the base electrode of dynatron Q without offset voltage will lead the dynatron Q open from the close estate, to stop self-diagnosing. To the positive half cycle of the next AC cycle, self-diagnosis will start to repeat again automatically. One end of capacitance C8 in series with one LED D7, will not be influenced of normal charge when in the negative half cycle of the power supply, nor did the OC be influenced of normal work in the positive half cycle of the power supply.

This invention fully utilize the characteristic of the positive-and-negative half cycles of the power supply, to reach the self-diagnosis function as well as influence the normal trip, and in this self-diagnosis circuit, also switch function of the dynatron is utilized, to make the man-made fault signal of said self-diagnosis circuit only can stay in positive half cycle for a pre-determined short-period time, so even the detection circuit is a little time-lapse, that can not influence the normal trip to negative half cycle. Skilled worker in this area can easily imagine, this invention also can be designed as the mode in which normal trip will happen during the positive half cycle of power supply, and self-diagnosis fault-detection signal is provided during the negative half cycle of power supply.

Capacitance C7, resistance R10 and LED1 form an indication circuit 19 for end of life. When the control circuit of GFCI along with the OC in normal self-diagnosis, the emitter junction of the output end of OC provides a trigger signal to the controllable silicon SCR2, making the controllable silicon SCR2 open all along, corresponding to the LED1 as a fault-indicator light in short circuit, so LED1 cannot shine in normal use. When the control circuit is in fault, such as some components spoiled, or creepage protection function lost, that will cause the OC not work, making the controllable silicon SCR 2 be changed to the open estate from close estate, in this way, the circuit which originally should be closed through the controllable silicon SCR2, only can be closed through the LED1, to make the LED 1 as a fault indicator light shine, reminding the user to update the GFCI duly.

As shown in drawing 1, if D6 or trip winding J open the circuit, in negative half cycle of power supply, capacitance C8 cannot charge, while during self-diagnosis detection of positive half cycle of power supply, capacitance C8 cannot discharge or charge, so the controllable silicon SCR 2 will also be open, the LED1 shining. If the detection winding N1 spoiled, when do self-diagnosis, relevant signal should not be induced, making the controllable silicon SCR1 not be closed, so the capacitance C8 cannot discharge, the OC cannot work, and the controllable silicon SCR 2 also be open, to make the LED 1 shine. If amplifier circuit IC spoiled, the fault signal detected by the detection winding N1 cannot be amplified, and the controllable silicon SCR2 spoiled, and for the same principle, the LED 1 shines. If the dynatron Q is open, the self-diagnosis circuit cannot work, and the controllable silicon SCR 2 cannot closed, as a result, the LED 1 also can shine. In a word, if the control circuit according to this invention loses the creepage protection function, the LED1 as an indicator light for the end of life will shine, reminding the user replace the protection device in use, to ensure the security.

The described control circuit also can annex other important functions, for example, as shown in drawing 1 to 5, test switch TEST and test resistance R0 form a test circuit, wherein one end of the test resistance R0 is electrically connected to the power supply, the other end of R0 is connected to the test switch TEST. The other end of the test switch is connected to the other end of the Load. The test circuit is to provide about 8-mA-value fault current for GFCI, for stated detection of the GFCI in working estate.

A reset control circuit is composed by reset switch RESET, interrupter switch K, resistance R4, capacitance C5, resistance R5, diode D5, SCR1, and trip winding J, wherein the SCR1 is controllable silicon, one end of the interrupter switch K is connected to R2, the other end of the interrupter switch K R2 is connected to R4 and C6, the other end of R4 and C6 is connected to the control cabinet of SCR1, and the control cabinet of SCR1 is connected to a capacitance C4 in series, for anti-jamming. The anode of SCR1 is connected to one end of trip winding J, the other end of J is connected to the power supply of GFCI in series by a diode D6. The reset switch RESET can be connected to the end of power supply Line at one end, and connected to the load end at the other end. This reset switch can be connected to at least one load end, and the power supply of the reset control circuit and the control circuit of GFCI are electrified at the same time. When the interrupter switch K is closed, direct power makes a signal generated on R4 by C6 charging, the signal leading the SCR1 closed, trip winding J being electrified by man-power to generate an instantaneous electromagnetism which causes trip organ motion of the GFCI, to make the reset switch closed, that is to say that the GFCI is on reset estate. Utilizing the charge and discharge process of C6, the SCR1 of trip winding J can be controlled to trigger for only one time once the interrupter switch K being closed, to ensure the trip winding J not to be burned out after long time contact. Reset control circuit and trip control circuit are to use the same controllable silicon namely the SCR1, thus to reinforce wiring in reverse protection function for the GFCI and control the increasing cost.

Neutral ground-fault protection circuit is composed of neutral ground protection winding N2, capacitance C2 and capacitance C3. Two conducting wires of the load connection circuit go through the neutral ground protection winding N2 which is paralleled with C2. One end of the N2 is connected to one end of C3, and the other end of N2 is grounding, together with the other end of C3 connected to the pin of output end 7 of the IC. Neutral ground-fault protection is provided by a sine wave oscillator with oscillation frequency corresponding to the coupling sum of the transformer composed of N1 and N2. When neutral ground fault occurs, the oscillator starts to oscillate, and when the oscillation amplitude reaches the initialization of IC, the pin of trigger end 5 of IC exports trigger signal, then trip appears and GFCI is open.

Paralleling a pressure sensitive resistance MOV with the power supply, when there is high voltage in the power supply, the MOV can absorb high voltage instantaneously to make protection.

When wiring in reverse, the power supply is connected to the Load end, so before the reset switch closed, the control circuit cannot be electrified, the interrupter switch cannot be closed, and the SCR1 cannot be closed by man-made fault triggering, it is to say the trip winding J cannot be closed after triggered by man-made fault. In this case, the trip winding J cannot generate a corresponding electromagnetism to act on the tripper of GFCI, and the GFCI cannot be reset so that the GFCI cannot be electrified, to achieve the aim of wiring-in-reverse protection function.

Figure 3:
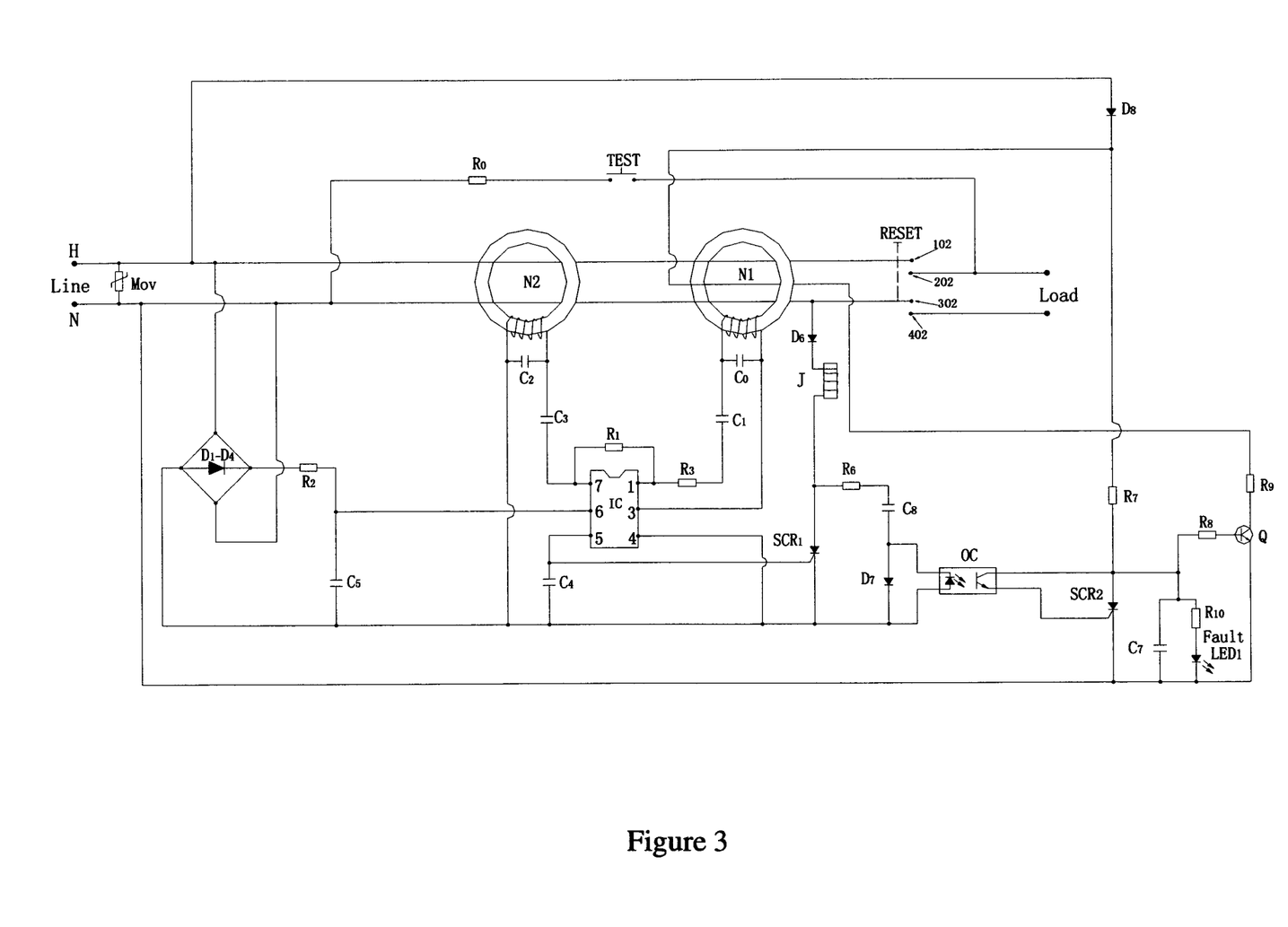
FIG. 3 is a third circuit diagram of this invention.

The control circuit of GFCI according to this invention also can intercalated to have only one load output, as shown in drawing 3, so this structured control circuit can be utilized on GFCI of pin mode.

Figure 4:
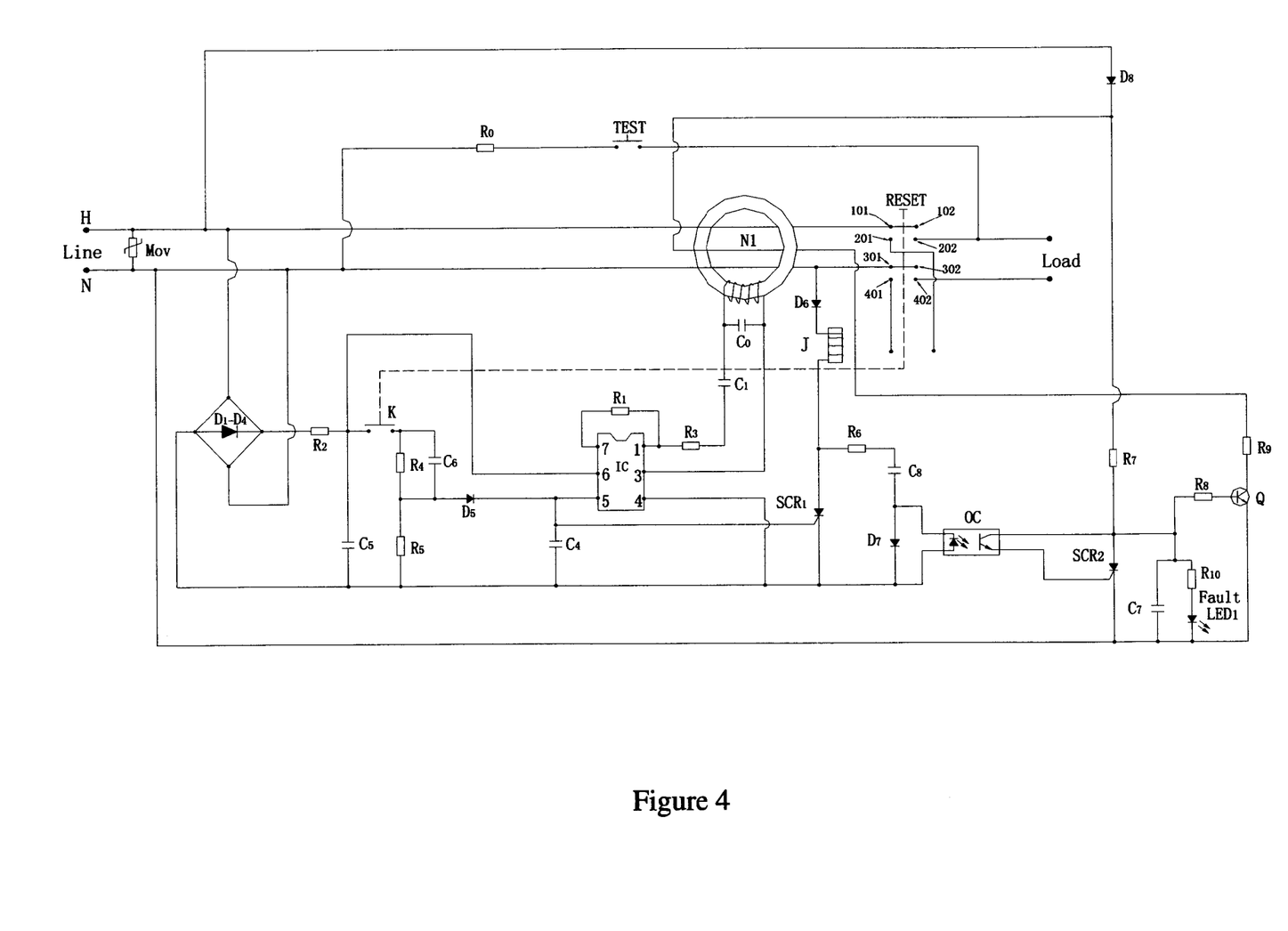
FIG. 4 is a fourth circuit diagram of this invention.
Figure 5:
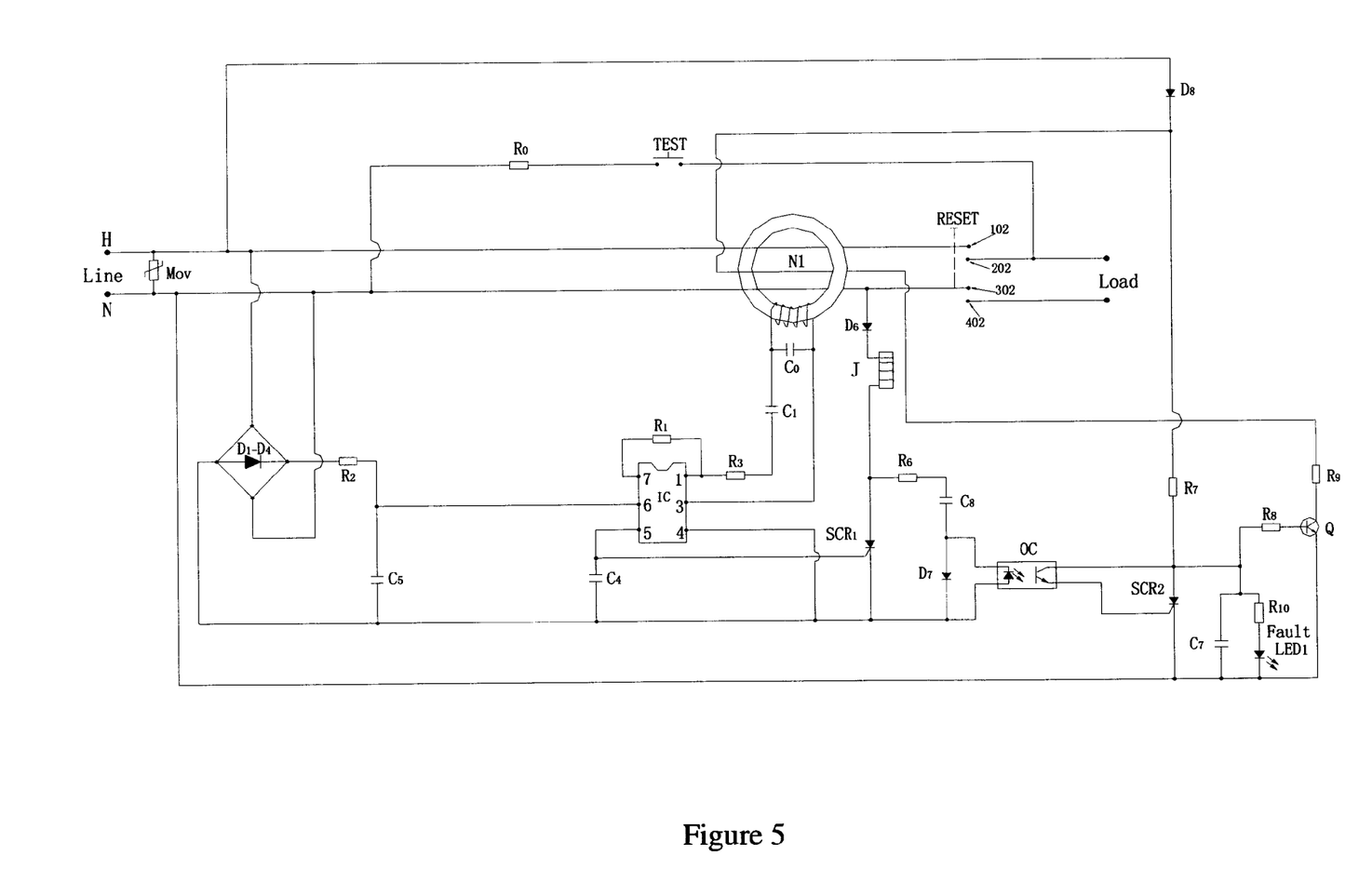
FIG. 5 is a fifth circuit diagram of this invention.

The control circuit of GFCI according to this invention can be modified to be a control circuit of another creepage protection device, by a little modification. As shown in drawing 4, the control circuit can be used on creepage protector only having creepage protection function in pin form, and also has wiring-in-reverse protection function, the output at least having one load. As shown in drawing 5, the control circuit sometimes can be used on the creepage protector only having creepage protection function in pin form, such as ALCI, LCDI, which are creepage protection interrupters, having creepage protection function, and self-diagnosis with indication function for end of life, breaching the shortage of creepage protection device at response for end of life response, to improve the creepage protection device of security capability by a long way.

To sum up, the control circuit of GFCI provided by this invention not only has creepage-fault protection function, but also has wiring-in-reverse function, neutral ground-fault protection function, self-diagnosis function and indication function for end of life, improving the security capability of the product by a long way.

Above described are only basic characteristics of this invention, and skilled worker in this area can do kinds of modification/ or alteration which belongs to the technical range of this invention.

The invention claimed is:

1. A control circuit of a ground fault circuit interrupter (GFCI) with creepage protection, said control circuit comprising:
    a load connection circuit (20), used to electrically connect a power end line and a load, transferring AC thereof;
    a creepage detection circuit (15), having a detection winding (N1) used for transforming the flux change into an influence potential output, a lead of said load connection circuit (20) going across said detection winding (N1);
    a trip circuit (23), having a trip winding (J), being used for current transformed into electromagnetism power; and
    a trip control circuit (16) electrically connected between said creepage detection circuit (15) and said trip winding and being used to compare an input electrical signal with a predetermined value, and while the input electrical signal being larger than the predetermined value, an output end of said trip control circuit (16) exporting effective electrical level; a self-diagnosis current generation circuit (21), coupled to said load connection circuit (20) on at least one end, and a lead of which goes across said detection winding (N1);
    a self-diagnosis display circuit (17), used for display of whether the creepage protection function is in good condition;
    a first switch duct (22), having at least two connection ends and a control end for controlling said connection end to be electrically connected or to be disconnected, with said control end being coupled to said output end of said trip control circuit (16), and said connection ends being respectively connected with said trip circuit (23) and said self-diagnosis display circuit (17), wherein one of said trip circuit (23) and self-diagnosis display circuit (17) is electrically connected when the input AC in positive half-cycle, while another is electrically connected when the input AC in negative half-cycle;
    a self-diagnosis terminal circuit (18) for disconnecting said self-diagnosis display circuit (17) after display is completed, wherein said self-diagnosis terminal circuit (18) includes a transistor (Q);
    said self-diagnosis display circuit (17) has an optoelectronic couple (OC) with an output end electrically connected to a second switch duct (SCR2), said second switch duct (SCR2) having at least two connection ends and a control end coupled to said output end of said OC for controlling said connection ends being electrically connected or disconnected; and
    wherein said transistor (Q) has a base electrode connected to one connection end of said second switch duct (SCR2), and wherein another connection end of said second switch duct (SCR2) is grounded.

2. A control circuit according to claim 1, wherein said self-diagnosis current generation circuit (21) includes a diode (D8) and a resistor (R9), and wherein said transistor (Q) also has a collector and an emitter, series of said diode (D8) and said resistor (R9) electrically connected to the load connection circuit (20) at one end, and electrically connected to said collector or said emitter of said transistor (Q).

3. A control circuit according to claim 1, wherein said self-diagnosis display circuit further comprises an indication circuit for the end of life (19), which is connected between said two connection ends of said second switch duct (SCR2).

4. A control circuit according to claim 3, wherein said indication circuit for end of life (19) includes a resistor (R10) and an LED (LED1), the series of said LED (LED1) and said resistor (R10) being electrically connected between the two connection ends of said second switch duct (SCR2), while a capacitor (C7) is paralleled to said two connection ends of said second switch duct (SCR2).

5. A control circuit according to claim 1, wherein said self-diagnosis display circuit (17) includes a resistor (R6), a capacitor (C8), a diode (D7) and an optoelectronic couple (OC), the series of said resistor (R6), said capacitor (C8) and said diode (D7) being electrically connected between said two connection ends of said first switch duct (22), and said OC being paralleled with the two ends of said diode (D7).

6. A control circuit according to claim 1 claim 1, wherein a diode (D6) is electrically connected to said trip winding (J) of said trip circuit (23).

* * * * *